United States Patent
Lee et al.

(10) Patent No.: US 9,549,444 B2
(45) Date of Patent: Jan. 17, 2017

(54) DIMMING SYSTEM AND OPERATING METHOD THEREOF

(71) Applicant: INDUSTRIAL TECHNOLOGY RESEARCH INSTITUTE, Hsinchu (TW)

(72) Inventors: Ching-Ran Lee, Kinmen County (TW); Wen-Tien Tsai, Pingtung County (TW); Tzu-Hung Yang, Tainan (TW)

(73) Assignee: INDUSTRIAL TECHNOLOGY RESEARCH INSTITUTE, Hsinchu (TW)

( * ) Notice: Subject to any disclaimer, the term of this patent is extended or adjusted under 35 U.S.C. 154(b) by 0 days.

(21) Appl. No.: 14/532,690

(22) Filed: Nov. 4, 2014

(65) Prior Publication Data
US 2016/0050735 A1 Feb. 18, 2016

(30) Foreign Application Priority Data
Aug. 13, 2014 (TW) .............................. 103127736 A

(51) Int. Cl.
*H05B 37/02* (2006.01)
*H05B 33/08* (2006.01)

(52) U.S. Cl.
CPC ...... *H05B 33/0851* (2013.01); *H05B 33/0815* (2013.01); *Y02B 20/42* (2013.01); *Y02B 20/46* (2013.01)

(58) Field of Classification Search
CPC .................................................... H05B 33/08
(Continued)

(56) References Cited

U.S. PATENT DOCUMENTS

| 7,023,142 B2 | 4/2006 | Chou et al. |
| 8,680,787 B2 | 3/2014 | Veskovic |

(Continued)

FOREIGN PATENT DOCUMENTS

| CN | 201422193 Y | 3/2010 |
| CN | 102164439 | 8/2011 |

(Continued)

OTHER PUBLICATIONS

Hwu, K.I., et al., "Controllable and Dimmable AC LED Driver Based on FPGA to Achieve High PF and Low THD," *IEEE Transactions on Industrial Informatics*, vol. 9, No. 3, pp. 1330-1342, Aug. 2013.

(Continued)

*Primary Examiner* — Minh D A
(74) *Attorney, Agent, or Firm* — Muncy, Geissler, Olds & Lowe, P.C.

(57) ABSTRACT

A dimming system comprises a controller and an AC-to-DC converter. The controller outputs a control signal in response to a dimming signal. The controller comprises a frequency adjustment circuit and a duty cycle adjustment circuit. The frequency adjustment circuit adjusts the frequency of the control signal in response to the dimming signal. The duty cycle adjustment circuit adjusts the duty cycle of the control signal in response to the dimming signal. The AC-to-DC converter converts an external power and to output a DC signal in response to the control signal so as to drive a light source by the DC signal. When the controller is operated at a first mode, the control signal has a first frequency and a first duty cycle. When the controller switches to a second mode, the control signal has a second frequency and a second duty cycle.

20 Claims, 6 Drawing Sheets

(58) Field of Classification Search
USPC ......... 315/291, 307, 200 R, 209 R, 246, 247
See application file for complete search history.

(56) References Cited

U.S. PATENT DOCUMENTS

| | | | |
|---|---|---|---|
| 2006/0125413 A1 | 6/2006 | Chou et al. | |
| 2009/0079357 A1* | 3/2009 | Shteynberg | H05B 33/0818 315/291 |
| 2010/0134038 A1 | 6/2010 | Shackle et al. | |
| 2011/0115412 A1* | 5/2011 | Welten | H05B 33/0815 315/307 |
| 2013/0278145 A1* | 10/2013 | Lin | H05B 33/0851 315/122 |

FOREIGN PATENT DOCUMENTS

| | | |
|---|---|---|
| CN | 103517510 A | 1/2014 |
| EP | 2522007 A | 1/2012 |
| JP | 2007305474 | 11/2007 |
| JP | 2013-503426 A | 1/2013 |
| TW | 200705351 A | 2/2007 |
| TW | 201339789 A | 10/2013 |
| TW | I430069 B | 3/2014 |
| TW | 201415947 | 4/2014 |

OTHER PUBLICATIONS

Doshi, M., et al, "Control of Solid-State Lamps Using a Multiphase Pulsewidth Modulation Technique," *IEEE Transactions of Power Electronics*, vol. 25, No. 7, pp. 1894-1904, Jul. 2010.

Chin-Sien Moo, et al., "An Efficient Driver for Dimmable LED Lighting," *IEEE Transactions on Power Electronics*, vol. 27, No. 11, pp. 4613-4618, Nov. 2012.

Galkins, I., et al., "Static Losses and Controllability of Current Fed Dimmable LED Drivers," In: *Proceedings of the 15th European Conference on Power Electronics and Applications (EPE 2013)*, 10 pgs., Sep. 2-6, 2013, doi:10.1109/EPE.2013.6631863.

Hwu, K.-I., et al., "Light-emitting diode driver with low-frequency ripple suppressed and dimming efficiency improved," *IET Power Electronics*, vol. 7, No. 1, pp. 105-113, Jan. 2014.

* cited by examiner

DIMMING SYSTEM AND OPERATING METHOD THEREOF

This application claims the benefit of Taiwan application Serial No. 103127736, filed Aug. 13, 2014, the disclosure of which is incorporated by reference herein in its entirety.

TECHNICAL FIELD

The disclosure relates in general to a dimming system and an operating method thereof, and more particularly to a dimming system and an operating method thereof applying a single-stage Alternating Current (AC)-to-Direct Current (DC) converter.

BACKGROUND

Generally, dimming technology can be divided into Pulse Width Modulation (PWM) dimming and amplitude-modulation (AM) dimming. In PWM dimming, the current of the light source consists of high and low levels and has a frequency of about 1 kHz. Accordingly, for specific situations or products (e.g., photographing, screen and etc.), the PWM dimming causes dark region and visual flicker. On the other hand, in AM dimming, when the magnitude of loading varies significantly, the driving circuit may produce an unstable light source current due to the too-low duty cycle, which flickers the light and limits the dimming range of AM dimming.

Therefore, there is a need for providing a dimming technology to make circuits have larger dimming range under a simple, low-interference and low cost configuration.

SUMMARY

The disclosure is directed to a dimming system and an operating method thereof applying a single-stage Alternating Current (AC)-to-Direct Current (DC) converter, which is capable of adjusting the frequency and duty cycle of a control signal outputted by a controller at the same time in response to a dimming signal, thereby improving the dimming range of the system.

According to an aspect of the present disclosure, a dimming system is provided. The dimming system comprises a controller and an AC-to-DC converter. The controller is configured to output a control signal in response to a dimming signal. The controller comprises a frequency adjustment circuit and a duty cycle adjustment circuit. The frequency adjustment is configured to adjust the frequency of the control signal in response to the dimming signal. The duty cycle adjustment circuit is configured to adjust the duty cycle of the control signal in response to the dimming signal. The AC-to-DC converter is configured to convert an external power and to output a DC signal in response to the control signal so as to drive a light source by the DC signal. When the controller is operated at a first mode, the control signal has a first frequency and a first duty cycle. When the controller switches to a second mode, the control signal has a second frequency and a second duty cycle.

According to another aspect of the present disclosure, an operating method of a dimming system is provided. The dimming system comprises a controller and an AC-to-DC converter. The operating method comprises: adjusting the frequency of a control signal in response to a dimming signal by a frequency adjustment circuit of the controller; adjusting the duty cycle of the control signal in response to the dimming signal by a duty cycle adjustment circuit of the controller; outputting the control signal by the controller; and converting an external power and generating a DC signal according to the control signal by an AC-to-DC converter so as to drive a light source via the DC signal; wherein when the controller is operated at a first mode, the frequency of the control signal is a first frequency and the duty cycle of the control signal is a first duty cycle; when the controller switches to a second mode, the frequency of the control signal is changed to a second frequency and the duty cycle of the control signal is changed to a second duty cycle.

Figure 1:
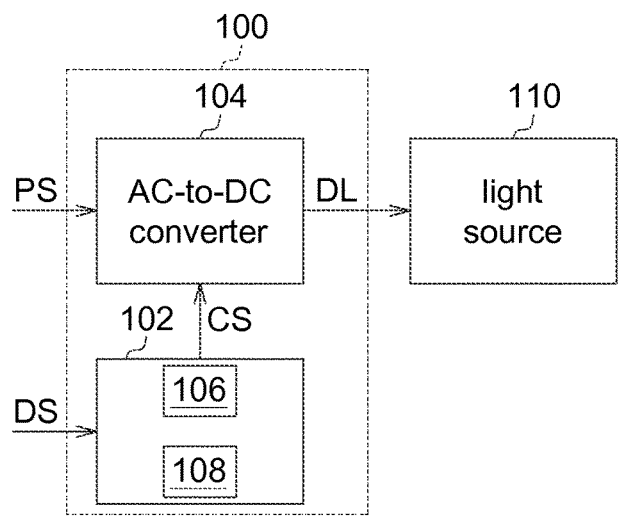
FIG. 1 shows a simplified block diagram of a dimming system according to an embodiment of the present disclosure.

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawing.

DETAILED DESCRIPTION

Below, exemplary embodiments will be described in detail with reference to accompanying drawings so as to be easily realized by a person having ordinary knowledge in the art. The inventive concept may be embodied in various forms without being limited to the exemplary embodiments set forth herein. Descriptions of well-known parts are omitted for clarity, and like reference numerals refer to like elements throughout.

FIG. 1 shows a simplified block diagram of a dimming system 100 according to an embodiment of the present disclosure. The dimming system 100 comprises a controller 102 and an Alternating Current (AC)-to-Direct Current (DC) converter 104. The controller 102 outputs a control signal CS in response to a dimming signal DS. The controller 102 comprises a frequency adjustment circuit 106 and a duty cycle adjustment circuit 108. The frequency adjustment circuit 106 adjusts the frequency of the control signal CS in response to the dimming signal DS. The duty cycle adjustment circuit 108 adjusts the duty cycle of the control signal CS in response to the dimming signal DS. The AC-to-DC converter 104 converts an external power PS and generates a DC signal DL according to the control signal CS so as to drive a light source 110 by the DC signal DL.

The abovementioned controller 102 can be realized by, for example, a microprocessor, a control integrated circuit (IC) or a circuit capable of performing dimming control. The dimming signal DS can be, for example, a voltage modulated signal, a constant voltage signal or a pulse width modulation (PWM) signal, which has a parameter (e.g., voltage level, frequency, duty cycle and etc.) corresponding to the brightness to be emitted by the light source 110. The control signal CS can be, for example, a PWM signal or a signal varying with frequencies and duty cycles. The external power PS can be, for example, a power supply. In the embodiment, because the external power PS is coupled to the light source 110 through only one stage of the AC-to-DC converter 104, the dimming system 100 can be regarded as a dimming system applying a single-stage AC-to-DC converter. Such a dimming system not only simplifies the system complexity, but it also reduces the manufacture costs.

The controller 102 may operate in different modes according to different lighting situations of the light source 110. In the present embodiment, when the controller 102 is operated in the first mode, the frequency of the control signal CS is a first frequency and the duty cycle of the control signal CS is a first duty cycle. When the controller 102 is operated in the second mode, the frequency of the control signal CS is changed to a second frequency and the duty cycle of the control signal CS is changed to a second duty cycle. The first mode is, for example, corresponding to a state before dimming the light source 110. In such case, the frequency and duty cycle of the control signal CS are respectively fixed to a first parameter value. Then, when the brightness of the light source 110 is to be changed, the controller 102 enters into the second mode. In such case, the frequency and duty cycle of the control signal CS are adjusted and fixed to a second parameter value so as to change the level of the DC signal DL, thereby adjusting the light of the light source 110.

The output power of dimming system 100 to the light source 110 determines the brightness of the light source 110. The output power can be expressed as follows:

$$P = \frac{V^2 D^2}{4Lf} \quad (1)$$

wherein V indicates the peak voltage of the external power PS, D indicates the duty cycle of the control signal CS, L indicates the internal inductance of the AC-to-DC converter 104, and f indicates the frequency of the control signal CS. In general applications, the peak voltage of the external power PS (parameter V) and the internal inductance of the AC-to-DC converter 104 (parameter L) can be regarded as constant values. Accordingly, it can be understood from equation (1) that the output power to the light source 110 can be adjusted by the duty cycle (parameter D) and frequency (parameter f) of the control signal CS. By adjusting the frequency together with the duty cycle of the control signal CS outputted by the controller 102, the total dimming range of the light source 110 can be significantly increased. Taking a system dimming the light only adjusted with frequency as an example, if the output power to the light source is required to be decreased from 100 W to 1 W, the frequency of the control signal is needed to be increased by 100 times. However, circuits usually cannot afford such a high-frequency control signal. In contrast, if the frequency of the control signal is adjusted together with the duty cycle of the control signal, e.g., reducing the duty cycle to ⅕ of the original value and increasing the frequency of the control signal by 4 times, the output power to the light source can also be decreased from 100 W to 1 W. Based on the above, in the present embodiment, when the brightness of the light source 110 in the second mode is smaller than that in the first mode, the second frequency can be designed to be larger than the first frequency, and the second duty cycle can be designed to be smaller than or equal to the first duty cycle.

As mentioned earlier, the controller 102 may generate a control signal CS having a specific frequency and a specific duty cycle according to the dimming signal DS. Since the frequency and duty cycle of the control signal CS do not need to vary with the sinusoidal change of the power supply PS continuously, the Electro Magnetic Interference (EMI) can be concentrated at specific frequency bands. This is advantageous to the design of an EMI filter circuit and thus the EMI filtering of the dimming system 100 can be enhanced.

Figure 2:
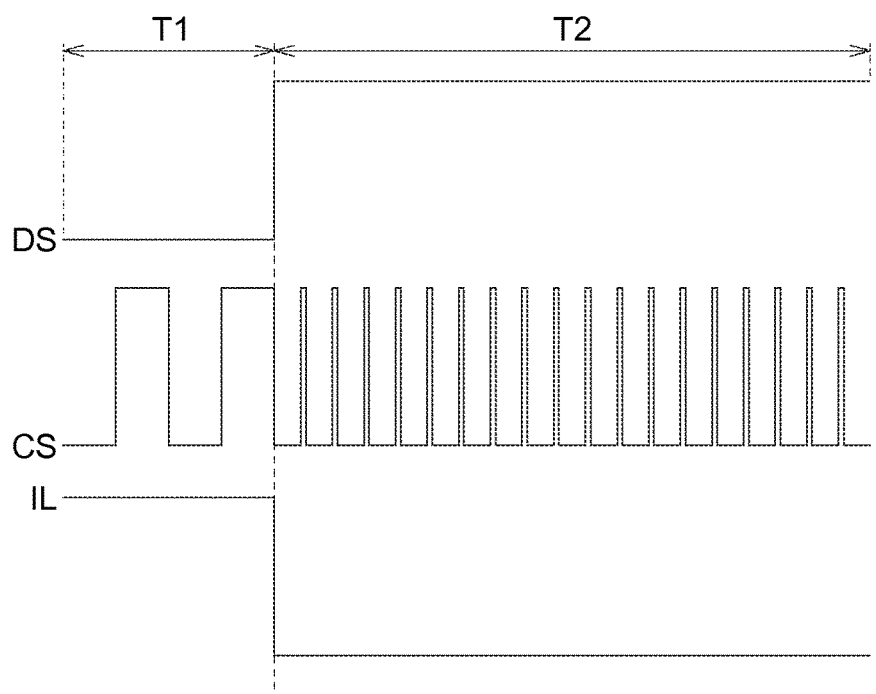
FIG. 2 shows an example of waveforms of associated signals of the dimming system.

FIG. 2 shows an example of waveforms of associated signals of the dimming system 100. In the example of FIG. 2, the brightness of the light source 110 in time intervals T1 and T2 are, for example, 80% and 10%, respectively. In time interval T1, the dimming signal DS is at a low level (e.g., 0V) and the controller 102 is operated in the first mode. At this time, the controller 102 generates a control signal CS having a frequency of 40 KHz and a duty cycle of 30% according to the dimming signal DS. A current IL generated based on the DC signal DL and flowing through the light source 110 is, for example, 200 mA. In time interval T2, the dimming signal DS is changed to a high level (e.g., 3V) and the controller 102 is operated in the second mode. At this time, the controller 102 generates a control signal CS having a frequency of 80 KHz (a relative high frequency) and a duty cycle of 3.4% (a relative short duty cycle) according to the changed dimming signal DS so that the current IL can be reduced to 10 mA. It is understood that the above examples are just given for illustration, not for limiting the parameter values used in the present disclosure.

Figure 3:
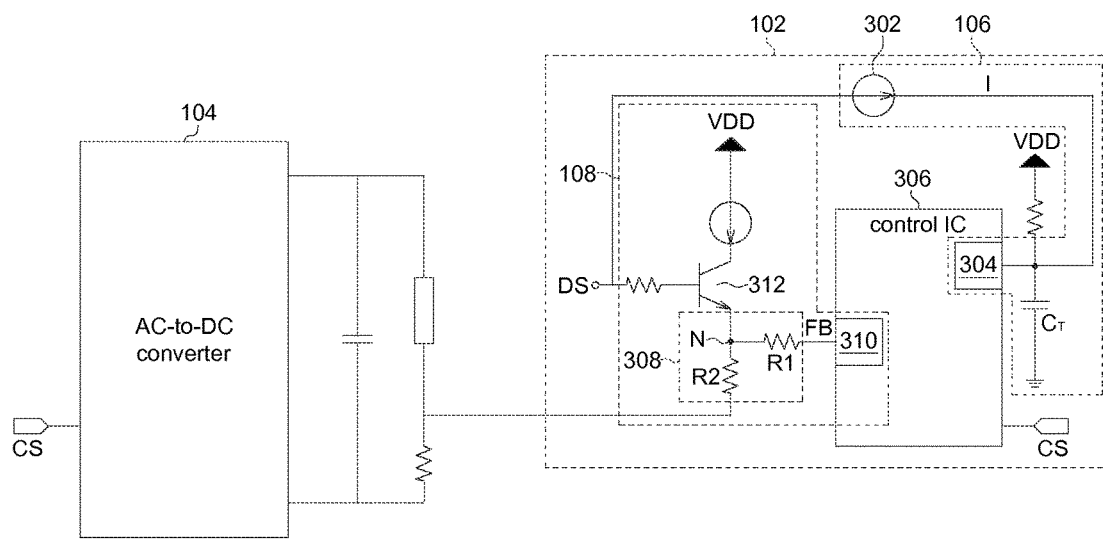
FIG. 3 shows an example of a circuit diagram of the dimming system.

FIG. 3 shows an example of a circuit diagram of the dimming system 100. In the example of FIG. 3, the frequency adjustment circuit 106 comprises a capacitor $C_T$, a current source 302 and a frequency processing circuit 304. The current source 302 is coupled to the capacitor $C_T$ and the frequency processing circuit 304. The current source 302 outputs a charging current I to the capacitor $C_T$ in response to the dimming signal DS so as to change the charging/discharging speed of the capacitor $C_T$ via the charging current I. The frequency processing circuit 304 changes the frequency of the control signal CS according to the charging/discharging speed of the capacitor $C_T$. In the present embodiment, the time required by the capacitor $C_T$ to charge to a transient level determines the frequency of the control signal CS. That is, when the capacitor $C_T$ receives the charging current I, the time required by the capacitor $C_T$ to charge to the transient level (e.g., 1.6V) is reduced, thereby causing the frequency processing circuit 304 to increase the frequency of the control signal CS. The frequency processing circuit 304 may be, for example, a part of the IC 306 or an independent processing circuit, which is capable of determining the frequency of the control signal CS according to the level switching frequency of the capacitor $C_T$. The IC 306 may be, for example, a UC3845BN control IC. However, the present disclosure is not limited thereto. The control IC 306 can also be realized by other circuits capable of generating PWM signals.

The duty cycle adjustment circuit 108 comprises a voltage division circuit 308 and a duty cycle processing circuit 310. The voltage division circuit 308 generates a feedback signal FB in response to the dimming signal DS and transmits the feedback signal FB to the duty cycle processing circuit 310. The duty cycle processing circuit 310 adjusts the duty cycle of the control signal CS according to the magnitude of the feedback signal FB. In the present embodiment, the voltage division circuit 308 may comprises a plurality of resistors (e.g., resistors R1 and R2). When the dimming signal DS is applied to base terminal of the bipolar junction transistor (BJT) 312 of the duty cycle adjustment circuit 108, the magnitude of the current source can then be determined, thereby adjusting the voltage of the voltage division node N. The higher the level of the dimming signal DS, the larger the current flowing through the BJT 312. As the level of the voltage division node N is increased, the level of the feedback signal FB is accordingly raised. When the level of the feedback signal FB received by the duty cycle processing circuit 310 becomes larger, the duty cycle processing circuit 310 may reduce the duty cycle of the control signal CS, thereby adjusting the duty cycle of the control signal CS. The duty cycle processing circuit 310 can be, for example, a part of the control IC 306 or an independent processing circuit.

According to the above, with the help of the frequency adjustment circuit 106 and the duty cycle adjustment circuit 108, the controller 102 is capable of adjusting the frequency and duty cycle of the control signal CS at the same time in response to the dimming signal DS, thereby improving the dimming range of the dimming system 100.

In the dimming system 100, the current source 302 of the frequency adjustment circuit 106 can be realized by various circuit configurations as long as such a circuit configuration is capable of generating the charging current I to the capacitor $C_T$ in response to the dimming signal DS, as shown in FIGS. 4-7.

Figure 4:
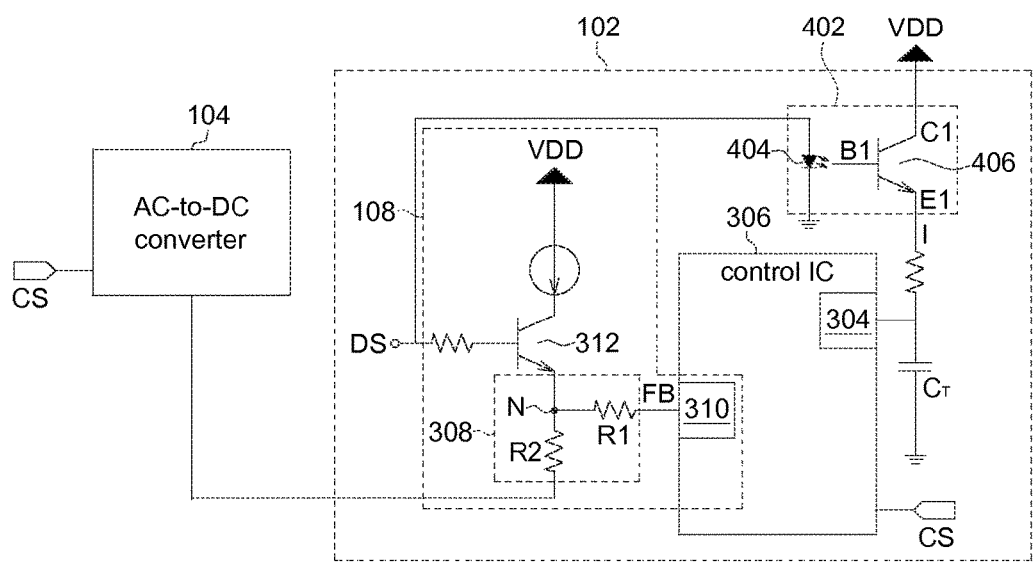
FIG. 4 shows an example of using a photo coupler to realize the current source of the dimming system.

FIG. 4 shows an example of using a photo coupler 402 to realize the current source 302 of the dimming system 100. As shown in FIG. 4, the current source providing the charging current I is a photo coupler 402. The photo coupler 402 comprises a photo diode 404 and a photo transistor 406. The photo diode 404 converts the dimming signal DS to generate light. The photo transistor 406 generates the charging current I in response to the light generated by the photo diode 404. Specifically, the photo transistor 406 comprises a base terminal B1, a collector terminal C1 and an emitter terminal E1. The base terminal B1 is controlled by the light generated by the photo diode 404. The collector terminal C1 is coupled to a reference supply voltage VDD (e.g., a supply voltage of 5V). The emitter terminal E1 is coupled to one end of the capacitor $C_T$ to provide the charging current I to the capacitor $C_T$.

Figure 5:
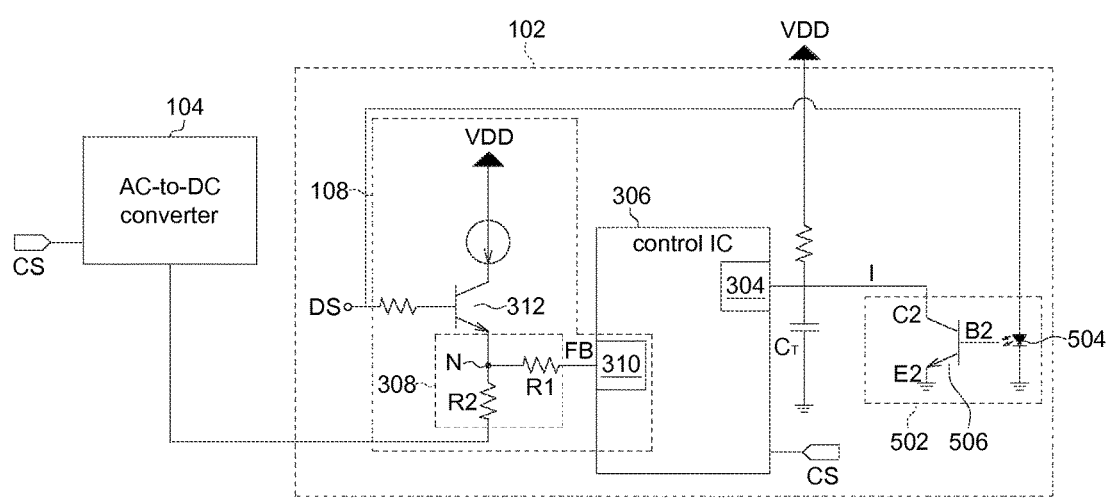
FIG. 5 shows an example of using a photo coupler to realize the current source of the dimming system.

FIG. 5 shows an example of using a photo coupler 502 to realize the current source 302 of the dimming system 100. As shown in FIG. 5, the current source providing the charging current I is a photo coupler 502. The photo coupler 502 comprises a photo diode 504 and a photo transistor 506. The photo diode 504 converts the dimming signal DS to generate light. The photo transistor 506 comprises a base terminal B2, a collector terminal C2 and an emitter terminal E2. The base terminal B2 is controlled by the light generated by the photo diode 504. The main difference between the present embodiment and the embodiment shown in FIG. 4 is that: the collector terminal C2 is coupled to one end of the capacitor $C_T$ to provide the charging current I to the capacitor $C_T$, and the emitter terminal E2 is coupled to a ground reference voltage (e.g., a ground voltage).

Figure 6:
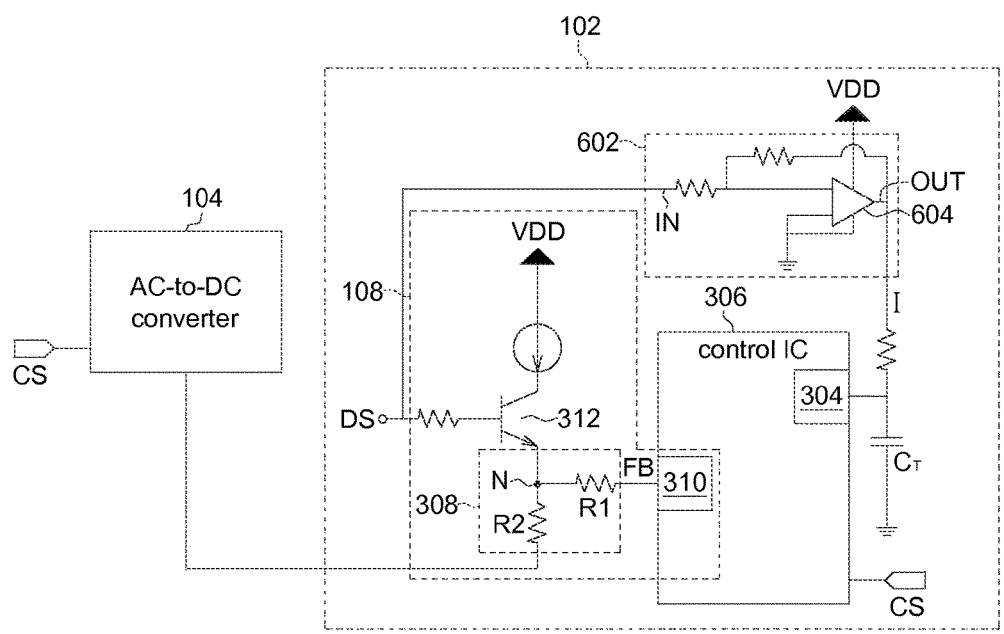
FIG. 6 shows an example of using an operational amplifier circuit to realize the current source of the dimming system.

FIG. 6 shows an example of using an operational amplifier circuit 602 to realize the current source 302 of the dimming system 100. By converting the dimming signal DS to the charging current I, the operational amplifier circuit 602 provides the charging current I to the capacitor $C_T$. Specifically, the operational amplifier circuit 602 comprises an operational amplifier 604 including an input terminal IN and an output terminal OUT. The input terminal IN receives the dimming signal DS. The output terminal OUT is coupled to one end of the capacitor $C_T$, for providing the charging current I to the capacitor $C_T$ in response to the dimming signal DS received by the input terminal IN.

Figure 7:
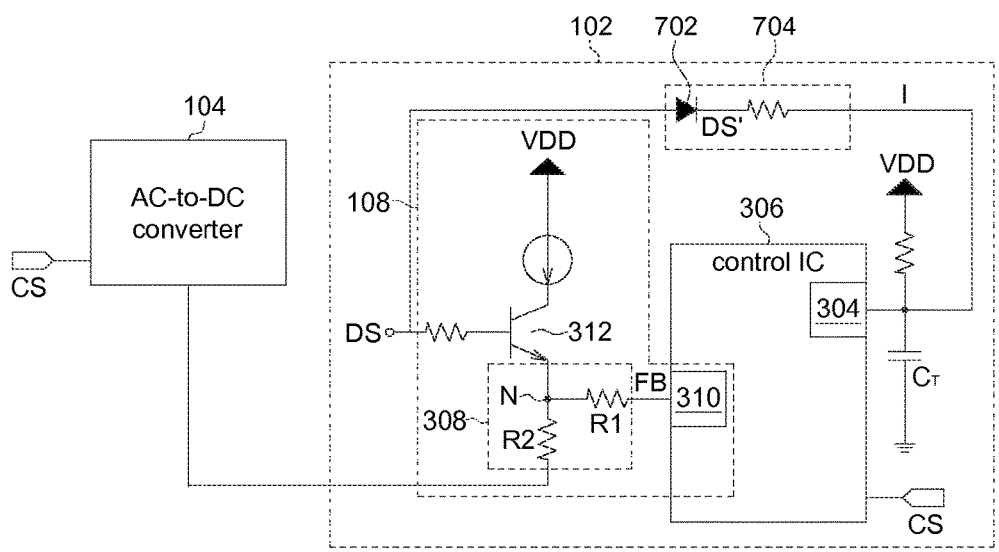
FIG. 7 shows an example of using a diode and a resistor to realize the current source of the dimming system.

FIG. 7 shows an example of using a diode 702 and a resistor 704 to realize the current source 302 of the dimming system 100. As shown in FIG. 7, the diode 702 receives the dimming signal DS and outputs an output signal DS'. The resistor 704 is coupled between the diode 702 and the capacitor $C_T$, for providing the charging current I to the capacitor $C_T$ according to the output signal DS' outputted by the diode 702.

The present disclosure further provides an operating method of the dimming system 100. The operating method comprises: adjusting the frequency of the control signal CS in response to the dimming signal DS by the frequency adjustment circuit 106 of the controller 102; adjusting the duty cycle of the control signal CS in response to the dimming signal DS by the duty cycle adjustment circuit 108 of the controller 102; outputting the control signal CS by the controller 102; and converting the external power PS by the AC-to-DC converter 104 and generating the DC signal DL according to the control signal CS so as to drive the light source 110 via the DC signal DL; wherein when the controller 102 is operated in the first mode, the frequency of the control signal CS is fixed at a first frequency, and the duty cycle of the control signal CS is fixed to a first duty cycle; when the controller 102 is switched to the second mode, the frequency of the control signal CS is changed to a second frequency and the duty cycle of the control signal is changed to a second duty cycle.

Based on the above, the dimming system and operating method thereof of the present disclosure apply a single-stage AC-to-DC converter to simplify the circuit design, and in addition, the frequency and duty cycle of the control signal outputted by the controller can be adjusted at the same time in response to the dimming signal, thereby improving the dimming range of the dimming system. Moreover, for each dimming state, the control signal is fixed to a corresponding frequency, and this is advantageous to the EMI processing of system. Furthermore, the dimming system and operating method thereof of the present disclosure use DC signal to drive the light source so that a light source flicker can be avoided.

It will be apparent to those skilled in the art that various modifications and variations can be made to the disclosed embodiments. It is intended that the specification and examples be considered as exemplary only, with a true scope of the disclosure being indicated by the following claims and their equivalents.

What is claimed is:

1. A dimming system, comprising:
  a controller, outputting a control signal in response to a dimming signal, comprising:
    a frequency adjustment circuit, adjusting the frequency of the control signal in response to the dimming signal; and
    a duty cycle adjustment circuit, adjusting the duty cycle of the control signal in response to the dimming signal; and
  an Alternating Current (AC)-to-Direct Current (DC) converter, converting an external power and generating a DC signal according to the control signal so as to drive a light source via the DC signal;

wherein when the controller is operated at a first mode, the frequency of the control signal is a first frequency and the duty cycle of the control signal is a first duty cycle; when the controller switches to a second mode, the frequency of the control signal and the duty cycle of the control signal are simultaneously changed, the frequency of the control signal is changed to a second frequency and the duty cycle of the control signal is changed to a second duty cycle.

2. The dimming system of claim 1, wherein the frequency adjustment circuit comprises:
   a capacitor;
   a current source coupled to the capacitor, wherein the current source outputs a charging current to the capacitor in response to the dimming signal and changes the charging/discharging speed of the capacitor via the charging current; and
   a frequency processing circuit, changing the frequency of the control signal according to the charging/discharging speed of the capacitor.

3. The dimming system of claim 2, wherein the current source comprises a photo coupler, the photo coupler comprises:
   a photo diode, converting the dimming signal to generate light; and
   a photo transistor comprising:
   a base terminal, controlled by the light generated by the photo diode;
   a collector terminal, coupled to a reference supply voltage; and
   an emitter terminal, coupled to one end of the capacitor, providing the charging current to the capacitor.

4. The dimming system of claim 2, wherein the current source comprises a photo coupler, the photo coupler comprises:
   a photo diode, converting the dimming signal to generate light; and
   a photo transistor comprising:
   a base terminal, controlled by the light generated by the photo diode
   a collector terminal, coupled to one end of the capacitor, providing the charging current to the capacitor; and
   an emitter terminal, coupled to a reference ground voltage.

5. The dimming system of claim 2, wherein the current source comprises an operational amplifier circuit, the operational amplifier circuit comprises:
   an operational amplifier comprising:
   an input terminal, receiving the dimming signal; and
   an output terminal, coupled to one end of the capacitor, providing the charging current to the capacitor in response to the dimming signal received by the input terminal.

6. The dimming system of claim 2, wherein the current source comprises:
   a diode, receiving the dimming signal and outputting a signal; and
   a resistor, coupled between the diode and the capacitor, providing the charging current to the capacitor according to the signal outputted by the diode.

7. The dimming system of claim 2, wherein a time required by the capacitor to charge to a transient level determines the frequency of the control signal; when the capacitor receives the charging current, the time required by the capacitor to charge to the transient level is reduced thereby causing the frequency processing circuit to increase the frequency of the control signal.

8. The dimming system of claim 1, wherein the duty cycle adjustment circuit comprises:
   a voltage division circuit, generating a feedback signal in response to the dimming signal; and
   a duty cycle processing circuit, adjusting the duty cycle of the control signal according to the magnitude of the feedback signal.

9. The dimming system of claim 8, wherein when the magnitude of the feedback signal becomes larger, the duty cycle processing circuit reduces the duty cycle of the control signal.

10. The dimming system of claim 1, wherein when the brightness of the light source in the second mode is smaller than that in the first mode, the second frequency is larger than the first frequency and the second duty cycle is smaller than or equal to the first duty cycle.

11. An operating method of a dimming system, wherein the dimming system comprises a controller and an AC-to-DC converter, the operating method comprises:
   adjusting the frequency of a control signal in response to a dimming signal by a frequency adjustment circuit of the controller; and
   adjusting the duty cycle of the control signal in response to the dimming signal by a duty cycle adjustment circuit of the controller; and
   outputting the control signal by the controller; and
   converting an external power and generating a DC signal according to the control signal by an AC-to-DC converter so as to drive a light source via the DC signal;
   wherein when the controller is operated at a first mode, the frequency of the control signal is a first frequency and the duty cycle of the control signal is a first duty cycle; when the controller switches to a second mode, the frequency of the control signal and the duty cycle of the control signal are simultaneously changed, the frequency of the control signal is changed to a second frequency and the duty cycle of the control signal is changed to a second duty cycle.

12. The operating method of claim 11, wherein the frequency adjustment circuit comprises a capacitor, a current source coupled to the capacitor and a frequency processing circuit, the operating method further comprises:
   outputting, by the current source, a charging current to the capacitor in response to the dimming signal and changes the charging/discharging speed of the capacitor via the charging current; and
   changing the frequency of the control signal according to the charging/discharging speed of the capacitor by the frequency processing circuit.

13. The operating method of claim 12, wherein the current source comprises a photo coupler, the photo coupler comprises a photo diode and a photo transistor, the operating method further comprises:
   converting the dimming signal to generate light by the photo diode;
   generating the charging current in response to the light generated by the photo diode by the photo transistor; and
   providing the charging current to the capacitor by an emitter terminal of the photo transistor.

14. The operating method of claim 12, wherein the current source comprises a photo coupler, the photo coupler comprises a photo diode and a photo transistor, the operating method further comprises:
   converting the dimming signal to generate light by the photo diode;

generating, by the photo transistor, the charging current in response to the light generated by the photo diode; and providing the charging current to the capacitor by a collector terminal of the photo transistor.

15. The operating method of claim 12, wherein the current source comprises an operational amplifier circuit, the operating method further comprises:

converting the dimming signal to the charging current by the operational amplifier circuit to provide the charging current to the capacitor.

16. The operating method of claim 12, wherein the current source comprises a diode and a resistor coupled between the diode and the capacitor, the operating method further comprises:

receiving, by the diode, the dimming signal and outputting a signal; and providing, by the resistor, the charging current to the capacitor according to the signal outputted by the diode.

17. The operating method of claim 12, wherein a time required by the capacitor to charge to a transient level determines the frequency of the control signal, the operating method further comprises:

receiving the charging current by the capacitor to reduce the time required by the capacitor to charge to the transient level; and increasing the frequency of the control signal by the frequency processing circuit.

18. The operating method of claim 11, wherein the duty cycle adjustment circuit comprises a voltage division circuit and a duty cycle processing circuit, the operating method further comprises:

generating a feedback signal in response to the dimming signal by the voltage division circuit; and adjusting the duty cycle of the control signal according to the magnitude of the feedback signal by the duty cycle processing circuit.

19. The operating method of claim 18, wherein when the magnitude of the feedback signal becomes larger, the duty cycle processing circuit reduces the duty cycle of the control signal.

20. The operating method of claim 11, wherein when the brightness of the light source in the second mode is smaller than that in the first mode, the second frequency is larger than the first frequency and the second duty cycle is smaller than or equal to the first duty cycle.

* * * * *